United States Patent
Welty et al.

(10) Patent No.: US 10,769,716 B2
(45) Date of Patent: Sep. 8, 2020

(54) CUSTOMER ASSISTED ROBOT PICKING

(71) Applicant: Locus Robotics Corp., Wilmington, MA (US)

(72) Inventors: Bruce Welty, Boston, MA (US); Michael Charles Johnson, Ashland, MA (US); Karen Leavitt, Sudbury, MA (US)

(*) Notice: Subject to any disclaimer, the term of this patent is extended or adjusted under 35 U.S.C. 154(b) by 0 days.

(21) Appl. No.: 16/210,775

(22) Filed: Dec. 5, 2018

(65) Prior Publication Data
US 2020/0184542 A1 Jun. 11, 2020

(51) Int. Cl.
| | |
|---|---|
| *G06K 15/00* | (2006.01) |
| *G06Q 30/06* | (2012.01) |
| *B25J 11/00* | (2006.01) |
| *G06K 9/00* | (2006.01) |
| *G06K 19/077* | (2006.01) |
| *G06Q 10/08* | (2012.01) |
| *G06Q 30/02* | (2012.01) |

(52) U.S. Cl.
CPC ...... *G06Q 30/0637* (2013.01); *B25J 11/0005* (2013.01); *B25J 11/008* (2013.01); *G06K 9/00288* (2013.01); *G06K 19/07758* (2013.01); *G06Q 10/087* (2013.01); *G06Q 30/0208* (2013.01)

(58) Field of Classification Search
USPC ........................................ 235/383, 375, 385
See application file for complete search history.

(56) References Cited

U.S. PATENT DOCUMENTS

| | | | |
|---|---|---|---|
| 9,463,927 B1 | 10/2016 | Theobald | |
| 2002/0165790 A1* | 11/2002 | Bancroft | ............ G06Q 30/0201 705/7.29 |
| 2004/0111320 A1* | 6/2004 | Schlieffers | ............ B62B 3/1424 705/16 |
| 2010/0296908 A1 | 11/2010 | Ko | |
| 2011/0200420 A1 | 8/2011 | Driskill et al. | |
| 2012/0330458 A1 | 12/2012 | Weiss | |
| 2013/0317642 A1 | 11/2013 | Asaria et al. | |
| 2016/0185375 A1* | 6/2016 | Yu | ........................... B62B 3/146 224/411 |
| 2016/0364786 A1* | 12/2016 | Wankhede | ......... G06Q 30/0633 |
| 2017/0050321 A1* | 2/2017 | Look | .............. G06Q 10/063114 |
| 2017/0225321 A1* | 8/2017 | Deyle | .................... B25J 9/1679 |

(Continued)

OTHER PUBLICATIONS

International Search Report with Written Opinion, dated Feb. 12, 2020, received in international patent application No. PCT/US2019/063922, 9 pages.

*Primary Examiner* — Tuyen K Vo
(74) *Attorney, Agent, or Firm* — Verrill Dana, LLP; John W. Powell

(57) ABSTRACT

A method for customer assisted robot picking includes navigating a robot to a pose location within a retail space in proximity to an item to be picked, the retail space having items for purchase by customers, the robot identifying, by a sensor in communication with the robot, a customer located within a zone proximate the robot, communicating to the customer information identifying the item to be picked, detecting presentation of the item by the customer for identification, and updating customer performance data stored in a customer account to include data corresponding to picking of the item by the customer.

30 Claims, 14 Drawing Sheets

(56) References Cited

U.S. PATENT DOCUMENTS

| | | | |
|---|---|---|---|
| 2017/0278047 A1 | 9/2017 | Dekin et al. | |
| 2017/0337506 A1* | 11/2017 | Wise | G06Q 10/087 |
| 2018/0354139 A1* | 12/2018 | Wang | B25J 11/008 |
| 2019/0318417 A1* | 10/2019 | Gumaru | G06K 7/1413 |
| 2020/0061839 A1* | 2/2020 | Deyle | B25J 9/1664 |

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID | |
|---|---|---|
| L01001A | 11 | ← 404 |
| L01001B | 11 | |
| L01001C | 11 | |
| L01001D | 11 | |
| L01001E | 11 | |
| L01001F | 11 | |
| L01002A | 12 | |
| L01002B | 12 | |
| L01002C | 12 | |
| L01002D | 12 | |
| L01002E | 12 | |
| L01003A | 13 | |
| L01003B | 13 | |
| L01003C | 13 | |
| L01003D | 13 | |
| L01003E | 13 | |
| L01003F | 13 | |
| L01004A | 14 | |
| L01004B | 14 | |
| L01004C | 14 | |
| L01004D | 14 | |
| L01004E | 14 | |
| L01005A | 15 | |
| L01005B | 15 | |
| L01005C | 15 | |
| L01005D | 15 | |
| L01005E | 15 | |
| L01005F | 15 | |

CUSTOMER ASSISTED ROBOT PICKING

FIELD OF THE INVENTION

This invention relates to robot picking and more particularly to customer assisted robot picking.

BACKGROUND OF THE INVENTION

Ordering products from retailers over the internet for home delivery or in-store pickup is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address or held at a retail location for pickup by the customer. The process of "fulfillment" involves physically taking or "picking" these items from a retail environment open to in-store customers, packing them, and either shipping them to the designated address or staging them at a specified on-site location for customer pickup. An important goal of the order-fulfillment process in a retail environment is thus to pick and pack as many items in as short a time as possible without negatively impacting the in-store shopping experience.

The order-fulfillment process typically takes place in a retail environment containing many products, including those listed in the order. Among the tasks of order fulfillment is therefore that of traversing the retail environment to find and collect the various items listed in an order. In addition, the products that will ultimately be shipped or staged first need to be received in the retail environment and stocked (placed) on retail display shelving in an orderly fashion throughout the retail environment so they can be readily retrieved both by in-store customers and by pickers fulfilling orders for shipping or in-store pickup.

In a retail environment, the goods that are being delivered and ordered can be stored far apart from each other and dispersed among a great number of other goods. An order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency and increases the number of employees required to perform the picking tasks.

In retail environments, placing and picking of items is typically performed by retail employees such as surplus cashiers, floor associates, stock associates, etc. That is, generally, specialized "pickers" are not typically available in a retail environment. Thus, a high volume of in-store pickup or in-store picking of orders to be shipped can result in a need to increase staffing levels, thereby increasing costs. Alternatively, if staffing levels are not sufficiently increased, the in-store customer experience is negatively impacted due to retail employees being preoccupied with picking tasks and thus inattentive to in-store customers.

BRIEF SUMMARY OF THE INVENTION

In order to increase picking efficiency and reduce required staffing load, robots may be used to perform functions of humans or they may be used to supplement the humans' activities. For example, robots may be assigned to "place" a number of items in various locations dispersed throughout the retail environment or to "pick" items from various locations for packing and shipping or staging. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves. In order to further drive efficiency in retail environments, in-store customers can be leveraged as human operators to perform at least some of the picking tasks.

Provided herein are methods and systems for customer assisted robot picking for improvement of pick efficiency in a retail environment.

In one aspect the invention features a method for customer assisted robot picking. The method includes navigating a robot to a pose location within a retail space in proximity to an item to be picked, the retail space having items for purchase by customers. The method also includes the robot identifying, by a sensor in communication with the robot, a customer located within a zone proximate the robot. The method also includes communicating to the customer information identifying the item to be picked. The method also includes detecting presentation of the item by the customer for identification. The method also includes updating customer performance data stored in a customer account to include data corresponding to picking of the item by the customer.

In some embodiments, the method also includes accessing, via the robot in response to the identification of the assisting customer, the customer account. In some embodiments, the method also includes receiving, from the customer account the updated customer performance data. In some embodiments, the method also includes rendering, on an interactive display device of the robot, in response to the customer performance data, at least one graphic representation of customer assistance achievement. In some embodiments, the step of identifying also includes reading, by the sensor, an ID tag of the customer. In some embodiments, the ID tag is at least one of a passive RFID tag, an active RFID tag, a Bluetooth transceiver, or a near-field communications (NFC) beacon. In some embodiments, the sensor is at least one of an RFID reader, a Bluetooth transceiver, or a NFC transceiver. In some embodiments, the step of identifying also includes capturing, by the sensor, a facial image of the customer. In some embodiments, the step of identifying also includes comparing the captured facial image to an image recognition database. In some embodiments, the sensor is at least one of a digital camera, a digital video camera, an image sensor, a charge coupled device (CCD), or a CMOS sensor. In some embodiments, the step of identifying also includes capturing, by the sensor, at least one of a voiceprint of the customer, a retinal pattern of the customer, or a fingerprint pattern of the customer. In some embodiments, the step of identifying also includes comparing the captured at least one of a voiceprint of the customer, a retinal pattern of the customer, or a fingerprint pattern of the customer to a corresponding customer account database. In some embodiments, the sensor is at least one of an imaging device, a camera, a video camera, an audio sensor, a retinal scanner, a fingerprint scanner, an infrared scanner, a barcode scanner, or a RFID reader. In some embodiments, the step of rendering also includes displaying at least one customer reward on the interactive display device. In some embodiments, the at least one customer reward is rendered in response to a milestone achieved by the customer. In some embodiments, the milestone includes at least one of a predefined number of units picked by the customer, a predefined pick rate of the customer, or a predefined number of units picked by the customer without scanning an erroneous unit. In some embodiments, the at least one customer reward includes one or more of an earned discount, a free promotional item, a store credit, a cash back incentive, redeemable loyalty points, or combinations thereof.

In another aspect the invention features a system for customer assisted robot picking. The system includes a robot operating within a retail space having items for purchase by customers. The system also includes a sensor in electronic communication with the robot. The robot includes a processor. The robot also includes a memory storing instructions. The instructions, when executed by the processor, cause the robot to navigate the robot to a pose location within the retail space in proximity to an item to be picked. The instructions, when executed by the processor, also cause the robot to identify, by the sensor, a customer located within a zone proximate the robot. The instructions, when executed by the processor, also cause the robot to communicate to the customer information identifying the item to be picked. The instructions, when executed by the processor, also cause the robot to detect presentation of the item by the customer for identification. The instructions, when executed by the processor, also cause the robot to update customer performance data stored in a customer account to include data corresponding to picking of the item by the customer.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the item location to fiducial identification mapping;

DETAILED DESCRIPTION OF INVENTION

Figure 1:
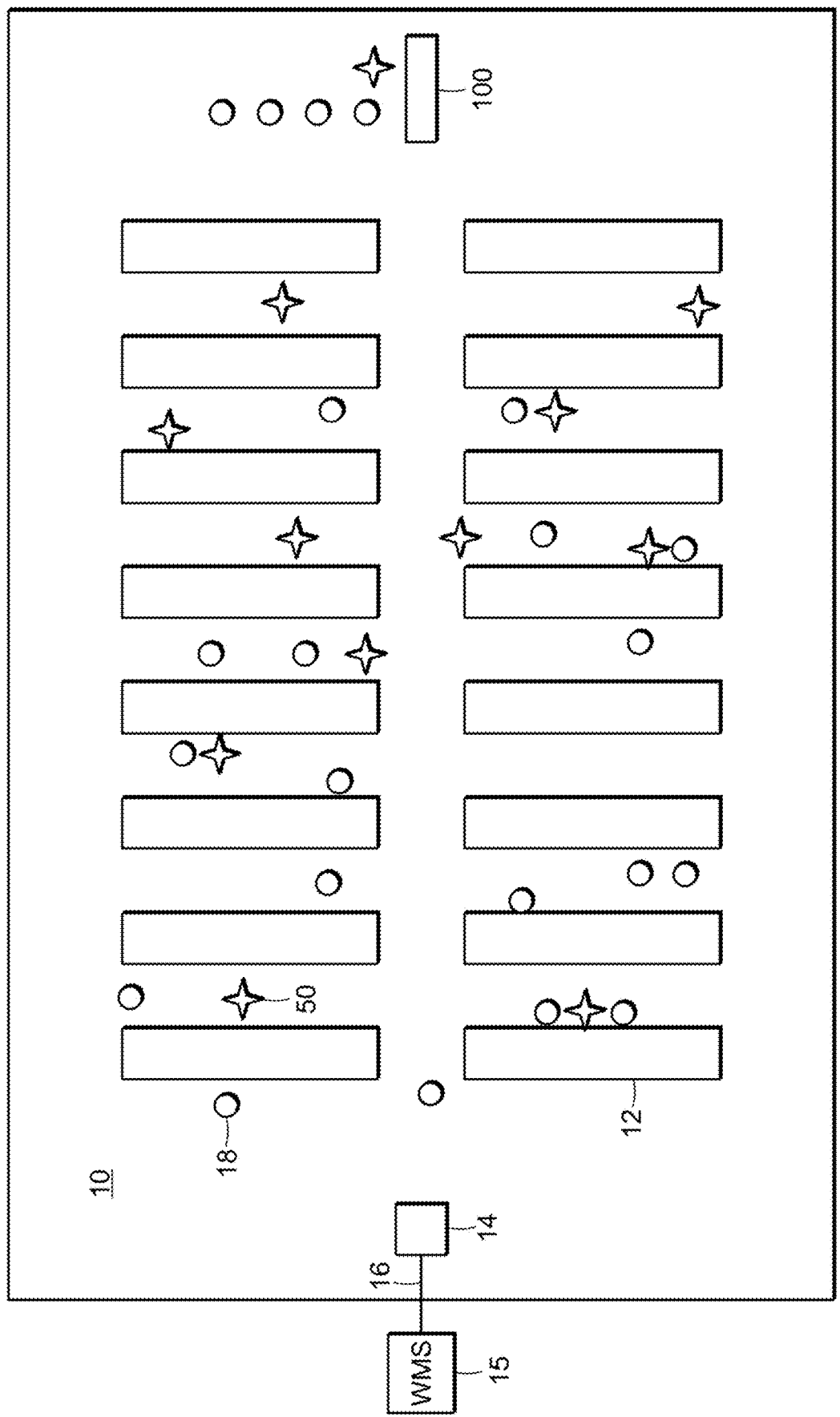
FIG. 1 is a top plan view of a retail environment.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The invention is directed to customer assisted robot picking. Although not restricted to any particular application, one suitable application that the invention may be used in is order fulfillment within a retail environment. The use of robots in this application will be described to provide context for the customer assisted robot picking but is not limited to that application. The term "retail environment", as used herein, can include any physical environment in which customers can shop for goods, products, services, or combinations thereof. For example, retail environments can include, but are not limited to, retail stores, electronics stores, department stores, "big box" retailers, hardware stores, home improvement stores, supermarkets, grocery stores, malls, outdoor markets, garden centers, any other physical environment in which customers can shop or combinations thereof.

Referring to FIG. 1, a typical retail environment 10 includes shelves 12 filled with the various items that could be included in an order. In operation, a retail management system 15 receives an incoming stream of orders 16 from customers who will pick up the orders in store and/or will get the orders shipped to a delivery address. The incoming stream of orders 16 is then sent by the retail management system 15 to an order-server 14. The order-server 14 may prioritize and group orders, among other things, for assignment to robots 18 during an induction process. As the robots are inducted by customers, at a processing station (e.g. station 100), the orders 16 are assigned and communicated to robots 18 wirelessly for execution. It will be understood by those skilled in the art that order server 14 may be a separate server with a discrete software system configured to interoperate with the retail management system 15 and retail management software or the order server functionality may be integrated into the retail management software and run on the retail management system 15.

Figure 2A:
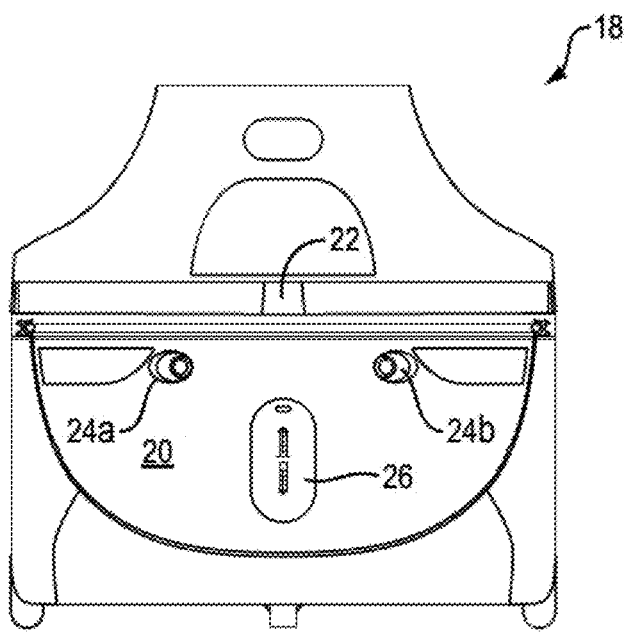
FIG. 2A is a front elevational view of a base of one of the robots used in the retail environment shown in FIG. 1.
Figure 2B:
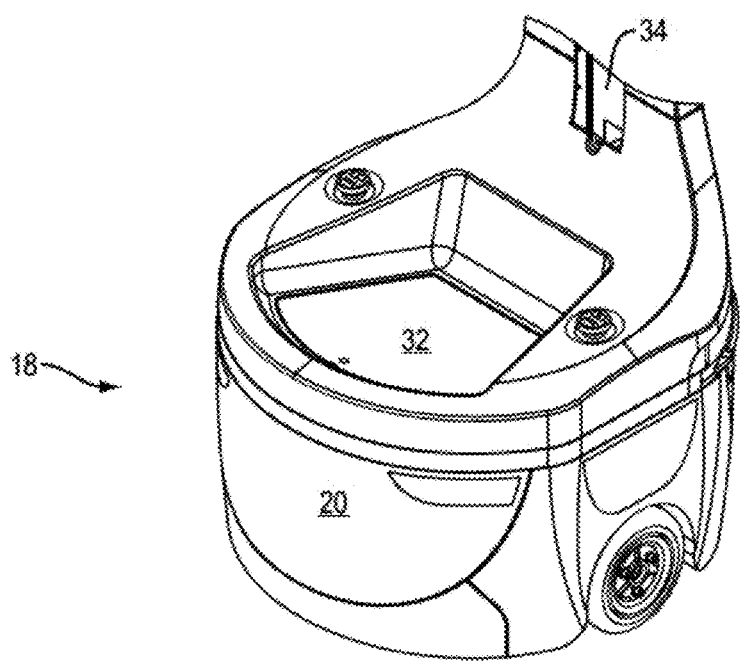
FIG. 2B is a perspective view of a base of one of the robots used in the retail environment shown in FIG. 1.
Figure 3:
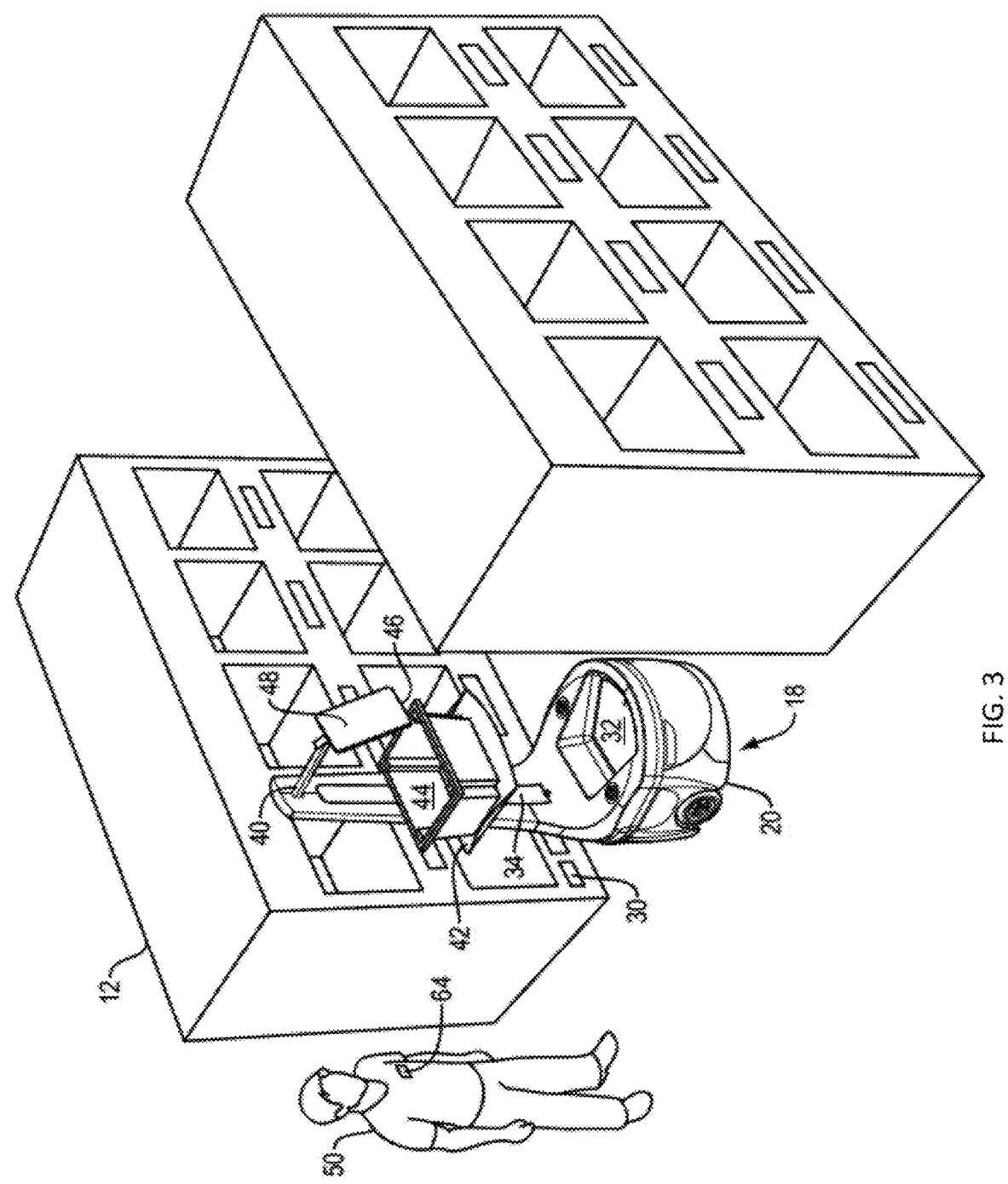
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from and transmit data to the order-server 14 and/or other robots, and a pair of digital optical cameras 24a and 24b. The robot base also includes an electrical charging port 26 for recharging the batteries which power autonomous wheeled base 20. The base 20 further features a processor (not shown) that receives data from the laser-radar and cameras 24a and 24b to capture information representative of the robot's environment. There is a memory (not shown) that operates with the processor to carry out various tasks associated with navigation within the retail environment 10, as well as to navigate to fiducial marker 30 placed on shelves 12, as shown in FIG. 3. Fiducial marker 30 (e.g. a two-dimensional bar code) corresponds to a location of an item ordered. The navigation approach of this invention is described in detail below with respect to FIGS. 4-8. Fiducial markers are also used to identify charging stations and the navigation to such charging station fiducial markers is the same as the navigation to the bin/location of items ordered. Once the robots navigate to a charging station, a more precise navigation approach is used to dock the robot with the charging station.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

With current robot technology, quickly and efficiently picking items from a shelf and placing them in the tote 44 is technically challenging due to functional difficulties associated with robotic manipulation of objects. Thus, currently, a more efficient way of picking items is to use an customer 50, to carry out the task of physically removing an ordered item from a shelf 12 and placing it on robot 18, for example, in tote 44. The robot 18 communicates the order to the customer 50 via the tablet 48 (or laptop/other user input device), which the customer 50 can read, or by transmitting the order to a handheld device used by the customer 50.

Upon receiving an order 16 from the order server 14, the robot 18 proceeds to a first location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the retail environment 10 where a particular item can be found, and the cameras 24a and 24b to navigate.

Upon reaching the correct location (pose), the robot 18 parks itself in front of a shelf 12 on which the item is stored and waits for a customer 50 to retrieve the item from the shelf 12 and place it in tote 44. If robot 18 has other items to retrieve it proceeds to those locations. The item(s) retrieved by robot 18 are then delivered to a processing station 100, FIG. 1, where they are packed and shipped. While processing station 100 has been described with regard to this figure as being capable of inducting and unloading/packing robots, it may be configured such that robots are either inducted or unloaded/packed at a station, i.e. they may be restricted to performing a single function.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and customer 50 are described. However, as is evident from FIG. 1, a typical fulfillment operation includes many robots and customers working among each other in the retail environment to fill a continuous stream of orders.

The baseline navigation approach of this invention, as well as the semantic mapping of a SKU of an item to be retrieved to a fiducial ID/pose associated with a fiducial marker in the retail environment where the item is located, is described in detail below with respect to FIGS. 4-8.

Using one or more robots 18, a map of the retail environment 10 must be created and the location of various fiducial markers dispersed throughout the retail environment must be determined. To do this, one or more of the robots 18 as they are navigating the retail environment they are building/updating a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping (grid-mapping) approach is the preferred approach, but any suitable SLAM approach can be used.

Robot 18 utilizes its laser-radar 22 to create map 10a of retail environment 10 as robot 18 travels throughout the space identifying, open space 112, walls 114, objects 116, and other static obstacles, such as shelf 12, in the space, based on the reflections it receives as the laser-radar scans the environment.

Figure 4:
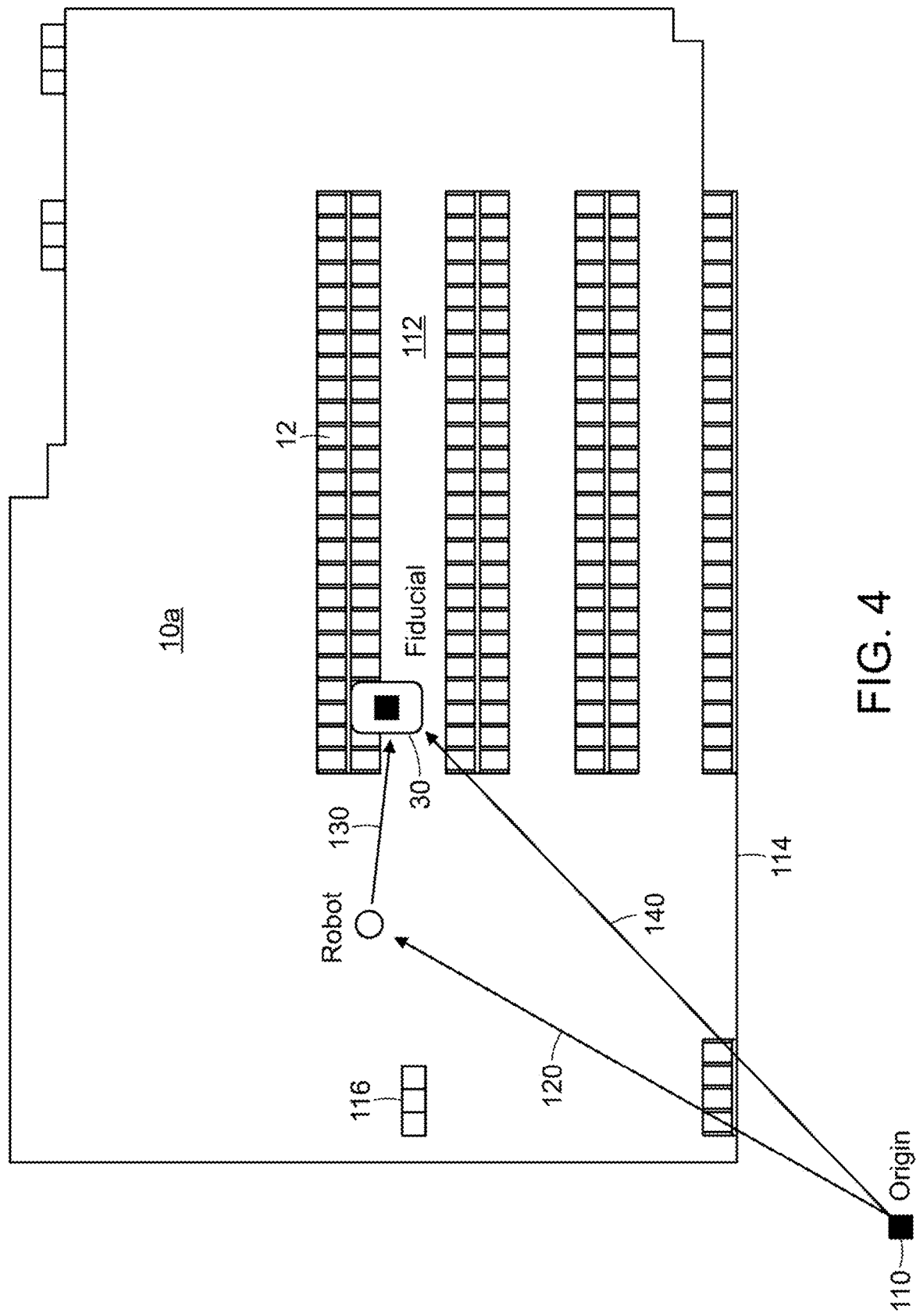
FIG. 4 is a partial map of the retail environment of FIG. 1 created using laser radar on the robot.

While constructing the map 10a (or updating it thereafter), one or more robots 18 navigates through retail environment 10 using camera 26 to scan the environment to locate fiducial markers (two-dimensional bar codes) dispersed throughout the retail environment on shelves proximate stock locations, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the retail environment relative to origin 110 is determined.

By the use of wheel encoders and heading sensors, vector 120, and the robot's position in the retail environment 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
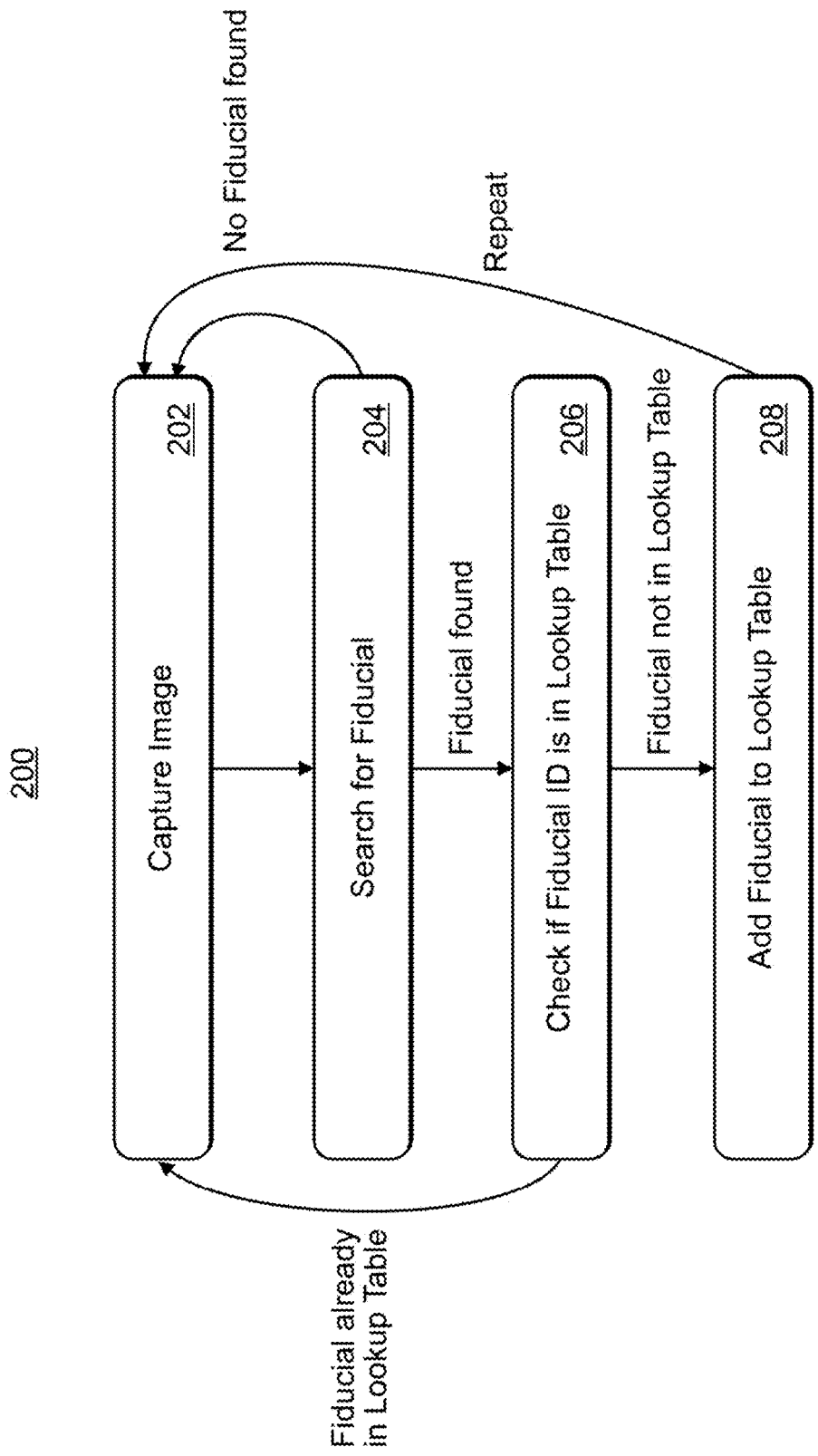
FIG. 5 is a flow chart depicting the process for locating fiducial markers dispersed throughout the retail environment and storing fiducial marker poses.

Flow chart 200, FIG. 5, describing the fiducial marker location process is described. This is performed in an initial mapping mode and as robot 18 encounters new fiducial markers in the retail environment while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the retail environment along with the orientation or the quaternion (x,y,z,ω).

In another look-up Table 400, FIG. 7, which may also be stored in the memory of each robot, is a listing of item locations (e.g. 402*a-f*) within retail environment 10, which are correlated to particular fiducial ID's 404, e.g. number "11". The item locations, in this example, consist of seven alpha-numeric characters. The first six characters (e.g. L01001) pertain to the shelf location within the retail environment and the last character (e.g. A-F) identifies the particular item location at the shelf location. In this example, there are six different item locations associated with fiducial ID "11". There may be one or more item locations associated with each fiducial ID/marker.

The alpha-numeric item locations are understandable to humans, e.g. customer 50, FIG. 3, as corresponding to a physical location in the retail environment 10 where items are stored. However, they do not have meaning to robot 18. By mapping the locations to fiducial ID's, Robot 18 can determine the pose of the fiducial ID using the information in table 300, FIG. 6, and then navigate to the pose, as described herein.

Figure 8:
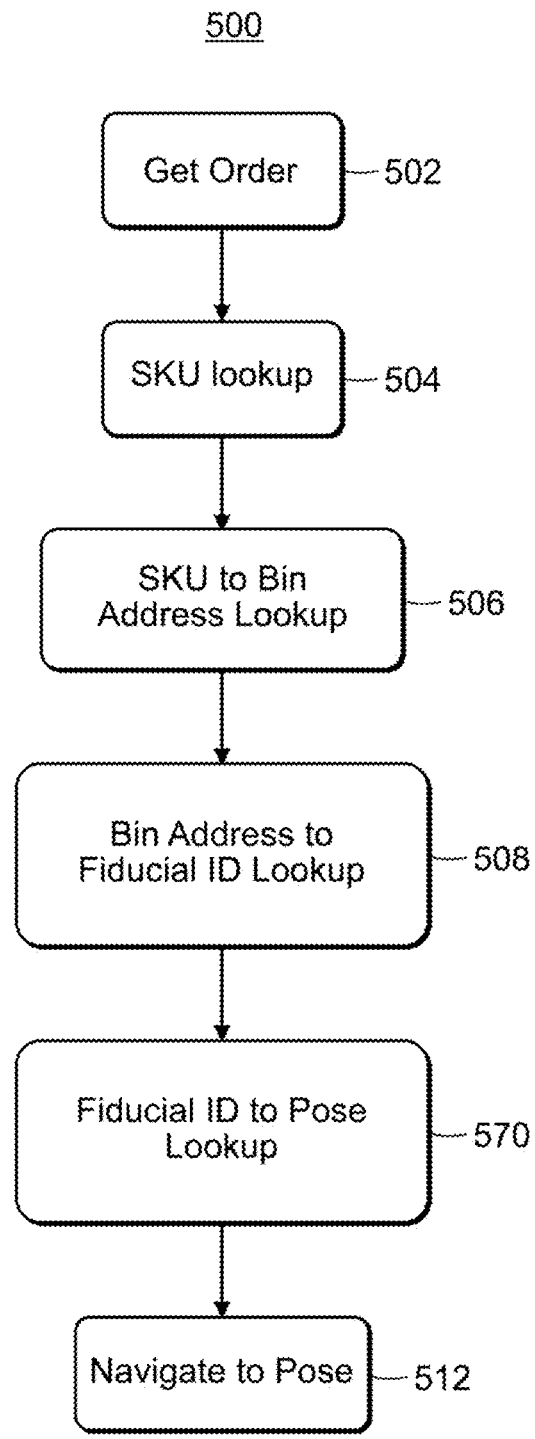
FIG. 8 is a flow chart depicting product SKU to pose mapping process.

The order fulfillment process according to this invention is depicted in flow chart 500, FIG. 8. In step 502, from retail management system 15, order server 14 obtains an order, which may consist of one or more items to be retrieved. It should be noted that the order assignment process is fairly complex and goes beyond the scope of this disclosure. One such order assignment process is described in commonly owned U.S. patent application Ser. No. 15/807,672, entitled Order Grouping in Warehouse Order Fulfillment Operations, filed on Sep. 1, 2016, which is incorporated herein by reference in its entirety. It should also be noted that robots may have tote arrays which allow a single robot to execute multiple orders, one per item or compartment. Examples of such tote arrays are described in U.S. patent application Ser. No. 15/254,321, entitled Item Storage Array for Mobile Base in Robot Assisted Order-Fulfillment Operations, filed on Sep. 1, 2016, which is incorporated herein by reference in its entirety.

Continuing to refer to FIG. 8, in step 504 the SKU number(s) of the items is/are determined by the retail management system 15, and from the SKU number(s), the item location(s) is/are determined in step 506. A list of item locations for the order is then transmitted to robot 18. In step 508, robot 18 correlates the item locations to fiducial ID's and from the fiducial ID's, the pose of each fiducial ID is obtained in step 510. In step 512 the robot 18 navigates to the pose as shown in FIG. 3, where an customer can pick the item to be retrieved from the appropriate item location and place it on the robot.

Item specific information, such as SKU number and item location, obtained by the retail management system 15/order server 14, can be transmitted to tablet 48 on robot 18 so that the customer 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the retail environment 10 and the walls 114, shelves (such as shelf 12) and other obstacles 116. As the robot begins to traverse the retail environment using its laser radar 26, it determines if there are any obstacles in its path, either fixed or dynamic, such as other robots 18 and/or customers 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the retail environment space without having to use more complex navigation approaches typically used which involve grid lines and intermediate fiducial markers to determine location within the retail environment.

Customer Identification and Achievement Tracking

Figure 9:
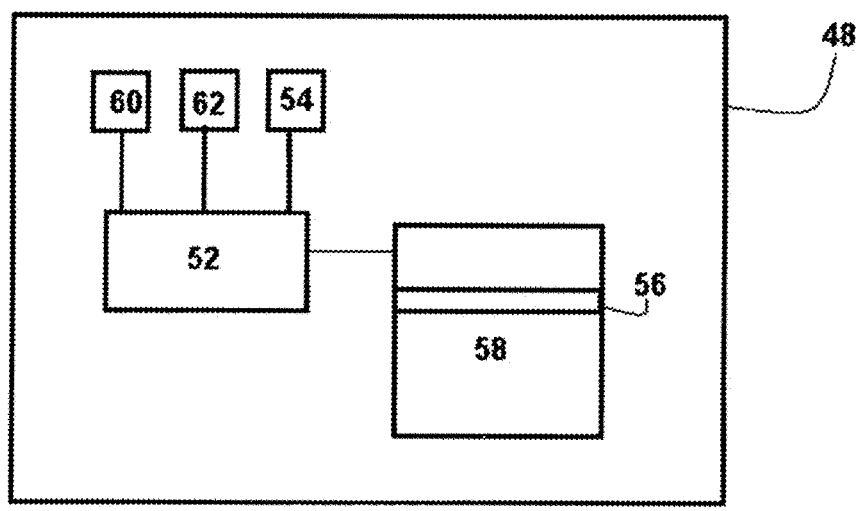
FIG. 9 is a block diagram illustrating an architecture of a tablet of the robot shown in FIG. 3.
Figure 10:
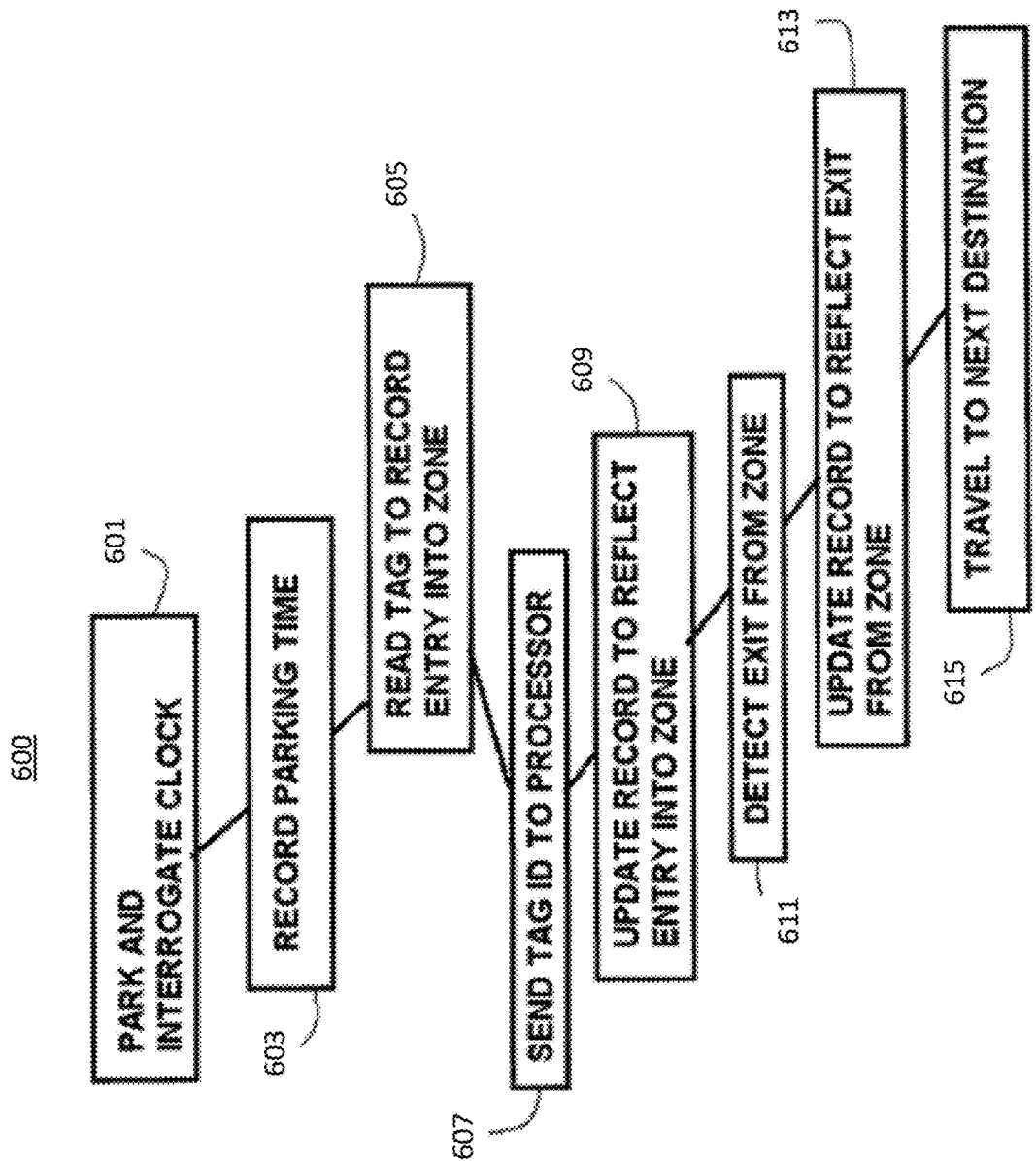
FIG. 10 is a flow-chart of a procedure executed by the tablet shown in FIG. 9.

As explained above, typically, upon reaching the correct location (pose), the robot 18 parks itself in front of a shelf 12 on which the item is stored and waits for a customer 50 to retrieve the item from the shelf 12 and place it in tote 44. Referring now to FIGS. 9 and 10, for each picking interaction between the robot 18 and the customer 50, the robot 18 can be configured to identify the customer 50 and track picking performance associated with the picking interaction such as, for example, number of items picked by the customer, pick rate of the customer, and/or error rate (e.g., number of units picked by the customer without scanning an erroneous unit or percentage of erroneously scanned items).

In particular, once the robot 18 is parked at the correct pose location proximate the fiducial 30, the robot 18 can interrogate a database-clock of a database in communication with the robot 18 to determine the time at which the robot 18 parked at the pose proximate the fiducial marker 30 (step 601 of method 600 of FIG. 10). The robot can then create a record in the database of the arrival time at the pose (step 603). In some embodiments, instead of interrogating the database-clock, the robot 18 may cause a database-timer to start counting time. In either case, the goal is to determine how long the robot 18 is kept waiting.

In some embodiments, the database in communication with the robot 18 can be a remote standalone database. In some embodiments, the database can be incorporated into a memory of the RMS 15 or the order-server 14. In some embodiments, the database can be incorporated into the tablet 48. In such embodiments a tablet-processor 52 can then interrogate a tablet-clock 54 to determine the time at which robot 18 parked at the pose proximate the fiducial marker 30 (step 601 of method 600 of FIG. 10). The tablet-processor 52 can then create a record 56 in a tablet-memory 58 of the arrival time at the pose (step 603). In some embodiments, instead of interrogating a tablet-clock 54, the tablet-processor 52 may instead cause a tablet-timer 60 to start counting time.

In general, after the robot 18 is parked at the pose, the customer 50 will see the robot 18 and walk toward it. The customer 50 then inspects the tablet 48 to determine which item should be retrieved, retrieves the item from the shelf 12, and places it on robot 18, for example, into the tote 44. In some embodiments, upon completion of the picking task, when the item has been placed on the robot 18, the robot 18 can re-interrogate the database-clock or stop the database-timer to determine a dwell time spent at each pose.

In some embodiments, the robot 18 can include a proximity sensor 62. In some embodiments, the proximity sensor 62 can be configured to detect any customer 50 approaching the robot 18. As further shown in FIG. 3, upon entry of the customer 50 into a proximity zone 66 surrounding the robot 18, the proximity sensor 62 can detect a tag 64 carried or worn by the customer 50 (step 605). Such tags 64 can include active or passive RFID tags, Bluetooth devices, near-field communications (NFC) devices; cellphones, smartphones, or any other suitable devices.

Referring again to FIGS. 9 and 10, to the extent that the customer 50 is carrying the tag 64, the proximity sensor 62 then communicates the information concerning the tag 64 to the database (step 607). The database then updates the record to document identification information associated with the tag 64. If desired, the robot can also record a time at which the customer 50 entered the zone (step 609).

The customer 50 then inspects the tablet 48 to learn which item or items should be picked. Alternatively, the robot 18 (e.g., via tablet 48) can transmit information concerning an item to be picked to a handheld device used by the customer 50. The customer 50 then retrieves the item or items from the shelf 12 and places the item or items into the tote 44, at which point the robot 18 indicates task completion and either re-interrogates the database-clock or stops the database-timer to determine dwell time of the robot 18 at that pose. The customer 50 then leaves the zone 66.

In some embodiments, the pose location of the robot 18 can be positioned such that the customer 50 does not have to leave the zone 66 to retrieve the item. To that end, and more generally, the size of zone 66 can vary depending on the particular application. For example, in some embodiments the zone 66 can be approximately one to two meters in diameter centered on the location of robot 18.

If desired, the proximity sensor 62 can detect the departure of the customer 50 (and, if applicable, the accompanying tag 64) from the zone 66 (step 611) and update the record 56 to reflect the time of departure (step 613). After the customer 50 leaves the zone 66, the robot 18 then moves on to its next destination (step 615), which could be another shelf 12 or a packing station for check-out.

Figure 11:
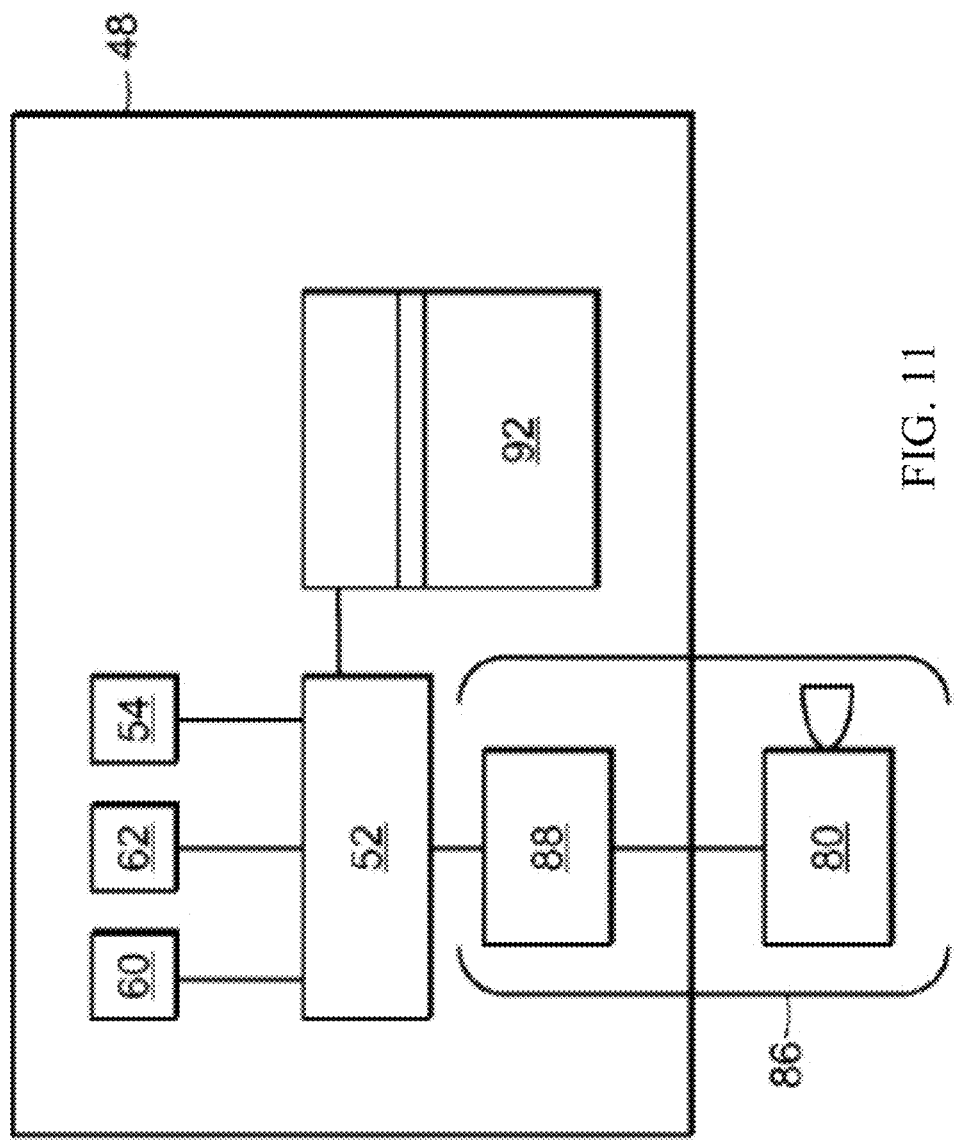
FIG. 11 is a block diagram illustrating an architecture of an alternative tablet of the robot shown in FIG. 3.

In other embodiments, shown in FIG. 11, the customer 50 does not need to carry an identifying tag 64 for the robot 48 to detect the customer 50 within the zone 66. Instead, the tablet 48 is coupled to an on-board identification system 86. For example, as shown in FIG. 11, the on-board identification system 86 includes an identification system 88 configured to receive identifying information from a user recognition device 90 and further configured to consult an identification database 92 to identify the customer 50. For example, in some embodiments, the user recognition device 90 can include one or more of an imaging device (e.g., having an image sensor such as a charge coupled device (CCD) or a CMOS sensor), a camera, a video camera, an audio sensor, a retinal scanner, a fingerprint scanner, an infrared scanner, a barcode scanner, or combinations thereof. In some embodiments, the identification database 92 can include a facial recognition database, a retinal database, a voice pattern database, a fingerprint database, a barcode database, or combinations thereof.

Regardless of the customer identification methodology, the robot 18 can associate the pick and any associated customer performance data to a corresponding customer account. The data collected by the tablet 48 can then be transmitted to the retail management system 15 and/or the order-server 14 either in real time as it is acquired or periodically for association with customer performance data stored in the customer account. The data thus collected provides a basis for rewarding performance of the customer 50 as well as any other customers that have interacted with the robot 18. In general, customer performance data such as number of items picked by the customer 50, pick rate of the customer 50, and/or error rate (e.g., number of units picked by the customer 50 without scanning an erroneous unit or percentage of erroneously scanned items) can be used in connection with a customer incentive reward program.

In addition to evaluating performance, data collected by the tablet 48, in particular, customer identification data, can be used by retail management system 15 for security purposes to determine if customer 50 is an authorized assisting customer, is authorized to operate in a particular region of the retail environment, or for a particular customer. Moreover, the identification data can be used to set preferences for customer 50, such as language used by tablet 48.

On a system wide basis, data corresponding to a plurality of interactions between a plurality of robots 18 and a plurality of customers 50 (e.g., as in a retail environment having a fleet of robots 18 each interacting with a plurality of retail environment picker customers 50 throughout various locations within the retail environment). Thus, for example, all of the other robots 18, as depicted in FIG. 1, also collect data from customers 50 with which they interact and transmit the data to management server 84. This data is thus available to management to assist with setting in-store staffing levels, permit informed assessment and adjustment of incentive rewards offered to customers 50, and track earned value associated with customer assisted picking.

The data collected by robot 18 and transmitted to retail management system 15 indicative of customer activity includes information regarding one or more of the following: the amount of time for a customer to enter the zone 66 after the robot 18 arrives at the pose, the amount of time customer 50 takes to exit zone 66 after the customer 50 enters the zone, the amount of time the customer 50 takes to perform a defined function, such as picking an item from shelf 12 and placing on the robot 18 or picking an item from robot 18 and placing it on shelf 12, and how many, if any, erroneous items are scanned by the customer 50.

By use of such data, the retail management system 15 can be configured to track customer efficiency based at least in part on the information collected indicative of customer activity. The management system 15 may be configured to maintain retail environment statistics based at least in part on this information. Customer efficiency and other statistics collected/computed may be may be used as an incentive to increase customer performance or in other ways by management. For example, to the extent that a particular pose is associated with abnormally long time for customers to perform a picking function, abnormally long time between customer entry and exit from the zone 66, or abnormally long time between arrival at the pose and customer entry of the zone 66, the management system 15 and/or order-server 14 can update the pose location to improve proximity to the corresponding shelf locations and/or to improve robot visibility.

Customer Incentive Reward Program

As explained above, in retail environments, placing and picking of items is typically performed by retail employees such as surplus cashiers, floor associates, stock associates, etc. Thus, a high volume of in-store pickup or in-store picking of orders to be shipped can result in a need to increase staffing levels, thereby increasing costs, and/or negatively impacting the in-store customer experience due to retail employees being preoccupied with picking tasks and thus inattentive to in-store customers. In order to reduce such added costs and keep retail employees available to in-store customers, in some embodiments, customer assisted picking using the robots 18 can be implemented. In order to incentivize customers 50 to participate in the customer assisted picking program, in some embodiments, a customer incentive reward program can be implemented.

Figure 12:
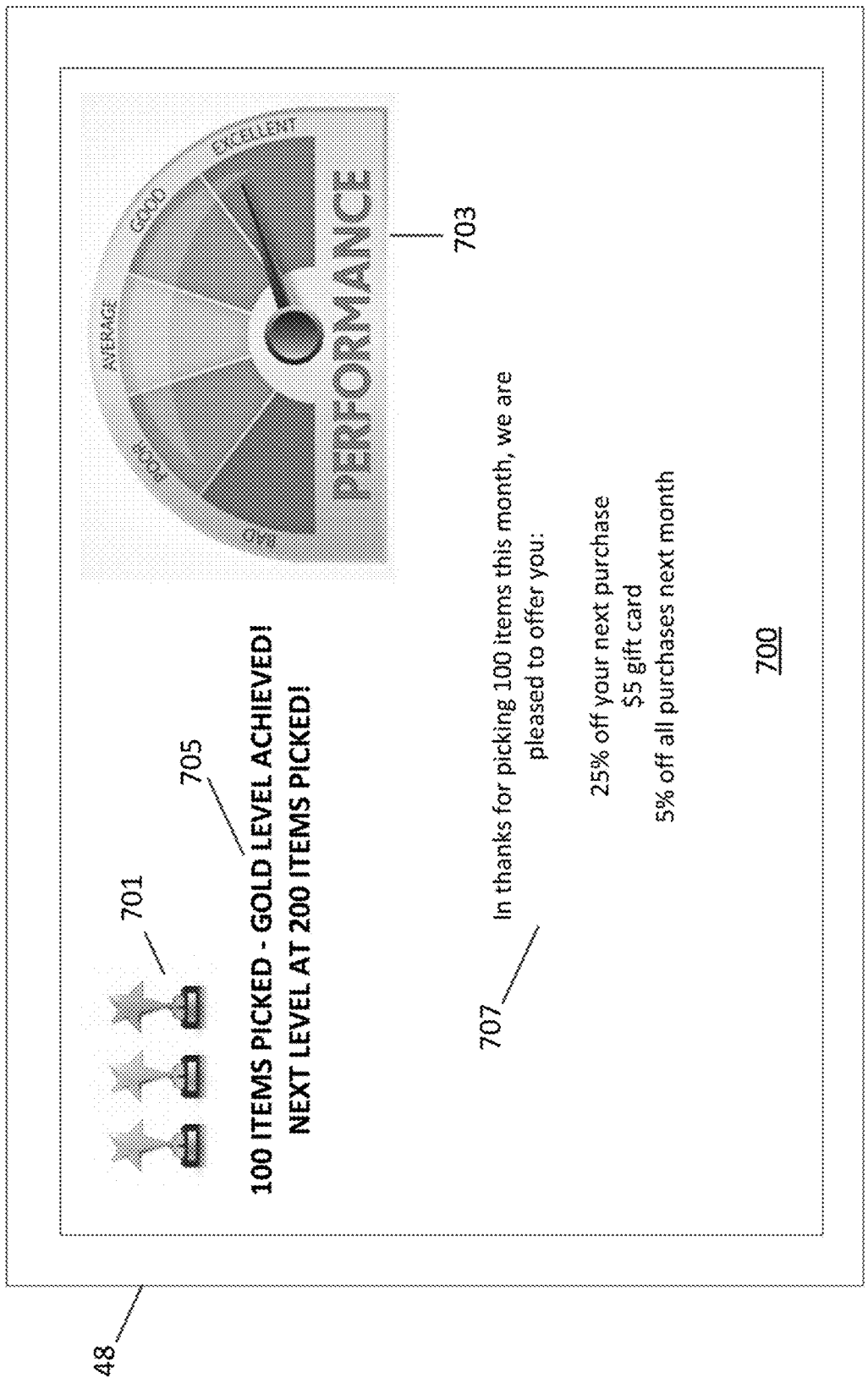
FIG. 12 is a diagram illustrating an example customer assistance achievement rendered on the tablet of the robot shown in FIG. 3.

As shown in FIG. 12, the customer incentive reward program, in some embodiments, can be presented to the customer 50 at least partially via a display 700 of the tablet 48. In particular, as shown for example in FIG. 12, the display 700 can include one or more indicators of current employee performance corresponding to the customer 50. Such performance indicators can include, for example, badges 701, a performance meter 703, a performance goal 705, a listing of earned incentives 707, or combinations thereof. It will further be apparent that the display 700 elements shown in FIG. 12 are for illustrative purposes only and that additional text data, numerical data, alternative graphics, or other customer performance related objects can be provided to the customer in some embodiments. For example, the customer 50, in some embodiments, can query one or more of an all-time highest pick rate (units per hour) achieved by any customer in the retail environment, an all-time highest pick rate achieved by the customer 50, a highest pick rate achieved by any customer 50 in the retail environment for a day, a week, a month, a quarter, a year, or any other temporal window, a highest pick rate achieved by the customer for a day, a week, a month, a quarter, a year, or any other temporal window, a highest number of units picked by any customer in the retail environment in an hour, a day, a week, a month, a quarter, a year, or any other temporal window, a highest number of units picked by the customer 50 in an hour, a day, a week, a month, a quarter, a year, or any other temporal window, average customer 50 pick rate, all time number of units picked by the customer 50, average pick rate of all customers 50, total units picked in the retail environment by all customers 50, whether all-time or in a day, a week, a month, a quarter, a year, or any other temporal window, average aggregate pick rate in the retail environment of all customers 50, whether all-time or in a day, a week, a month, a quarter, a year, or any other temporal window, or any other suitable performance data.

The badges 701, in some embodiments, can be awarded to the customer 50 upon achievement of one or more milestones. Milestones can include, for example, a number of units picked (e.g., 25, 50, 100, 1,000, 10,000, or any other number of units) by the customer 50, the customer 50 maintaining a predefined pick rate for one or more predetermined time periods, achievement of a personal best pick rate by the customer 50, conducting error free picking (e.g., not picking an erroneous item) by the customer 50 for a predetermined amount of time, or any other suitable milestones or achievements.

The performance meter 703, in some embodiments, can indicate customer 50 performance relative to one or more of customer-specific goals or standards, peer performance, or combinations thereof. For example, to reach a milestone or incentive, a customer 50 may have a target of picking 100 units in a month, which can be indicated as "average" or middle performance relative to other customer pickers (e.g., "AVERAGE" on the performance meter 703 shown in FIG. 12). The performance meter 703 can then, based on the customer's 50 actual number of units picked, indicate whether the performance is "BAD", "POOR", "AVERAGE", "GOOD", or "EXCELLENT". For example, in some embodiments, BAD can be any number of units less than 25, POOR can be any number of units between 25 and 74, AVERAGE can be any number of units between 75 and 124, GOOD can be any number of units between 125 and 149, and EXCELLENT can be any number of units greater than 150. However, it will be apparent in view of this disclosure that the performance meter 703 can be any suitable graphic (e.g., a dial meter as shown, a segmented bar, a solid bar, or any other suitable graphic) and can include color, grayscale, text, images, or any number and combination thereof to convey a performance status of the customer 50. It will be further apparent in view of this disclosure that, although shown as including five performance categories, labeled as "BAD", "POOR", "AVERAGE", "GOOD", and "EXCELLENT", the performance meter 703 can have any number of segments, categories, other performance indicators, or combinations thereof and that those segments, categories, other performance indicators, or combinations thereof can be unlabeled or labeled with any suitable label desired.

The performance goal 705 can be used to a goal performance level for reaching a next milestone and/or indicate recent performance achievement. For example, as shown in FIG. 12, the customer 50 has achieved "gold level" by picking 100 items and can achieve the next level by reaching 200 picked items. However, it will be apparent in view of this disclosure that any type and gradation of performance level can be used in accordance with various embodiments.

The customer assisted picking program, via the customer account, can further provide a reward/award mechanism for recognizing customer achievements. Such rewards can be presented by the robot 18 via the listing of earned incentives 707 displayed on the tablet 48. The listing 707 can provide the customer 50 with a list of incentive rewards associated with the performance level achieved by the customer 50. For example, as shown in FIG. 12, the customer has earned 25% off the customer's 50 next purchase, a $5 gift card, and 5% off all purchases next month. More generally, customer rewards can include one or more of an earned discount, a free promotional item, a store credit, a cash back incentive, redeemable loyalty points, or combinations thereof. However, it will be apparent in view of this disclosure that any reward structure can be used in connection with various embodiments.

Although described herein as being displayed on a tablet 48 of the robot 18, it will be apparent in view of this disclosure that customer performance data and outcomes can be displayed on any suitable device including a display. For example, the total number of customer assisted picks performed in a specified time period, in some embodiments, can be presented on one or more large displays located in and around the retail environment so that customers and employees can observe aggregated retail environment-wide performance without needing to query a robot 18. Additionally, in some embodiments, the robot 18 and/or tablet 48 may be in communication with a handheld or wearable device (e.g., a mobile phone, smart watch, augmented reality glasses, handheld scanner, other suitable devices, or combinations thereof), which can be used to display or otherwise communicate (e.g., via audio or video messages) customer performance data and outcomes to the customer 50.

Non-Limiting Example Computing Devices

Figure 13:
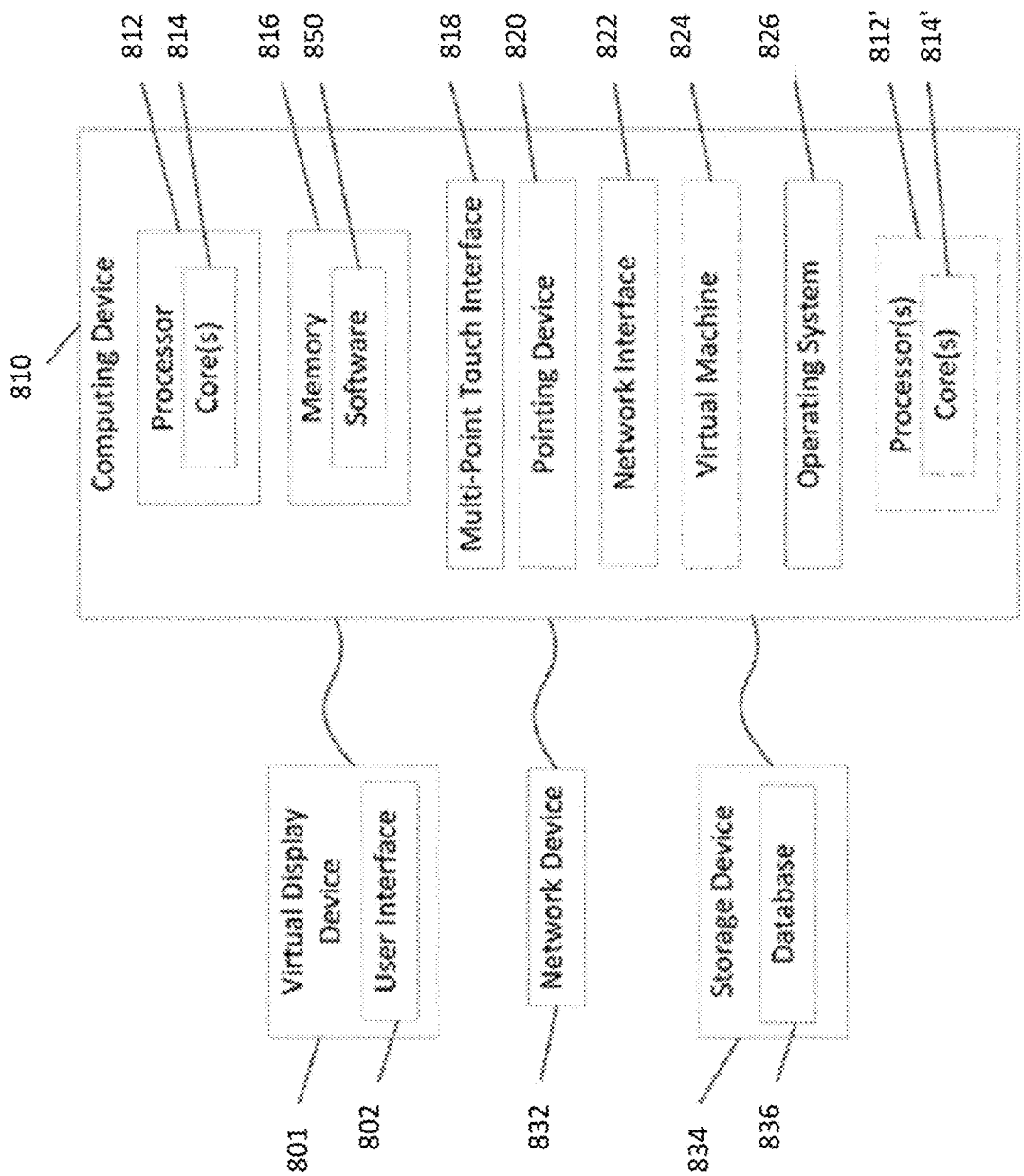
FIG. 13 is a block diagram of an exemplary computing system implemented in the robot of FIG. 3.

FIG. 13 is a block diagram of an exemplary computing device 810 such as can be used, or portions thereof, in accordance with various embodiments as described above with reference to FIGS. 1-12. The computing device 810 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 816 included in the computing device 810 can store computer-readable and computer-executable instructions or software for performing the operations disclosed herein. For example, the memory can store software application 840 which is programmed to perform various of the disclosed operations as discussed with respect to FIGS. 1-12. The computing device 810 can also include configurable and/or programmable processor 812 and associated core 814, and optionally, one or more additional configurable and/or programmable processing devices, e.g., processor(s) 812' and associated core (s) 814' (for example, in the case of computational devices having multiple processors/cores), for executing computer-readable and computer-executable instructions or software stored in the memory 816 and other programs for controlling system hardware. Processor 812 and processor(s) 812' can each be a single core processor or multiple core (814 and 814') processor.

Virtualization can be employed in the computing device 810 so that infrastructure and resources in the computing device can be shared dynamically. A virtual machine 824 can be provided to handle a process running on multiple processors so that the process appears to be using only one computing resource rather than multiple computing resources. Multiple virtual machines can also be used with one processor.

Memory 816 can include a computational device memory or random access memory, such as but not limited to DRAM, SRAM, EDO RAM, and the like. Memory 816 can include other types of memory as well, or combinations thereof.

A user can interact with the computing device 810 through a visual display device 801, such as a computer monitor, which can display one or more user interfaces 802 that can be provided in accordance with exemplary embodiments. The computing device 810 can include other I/O devices for receiving input from a user, for example, a keyboard or any suitable multi-point touch interface 818, a pointing device 820 (e.g., a mouse). The keyboard 818 and the pointing device 820 can be coupled to the visual display device 801. The computing device 810 can include other suitable conventional I/O peripherals.

The computing device 810 can also include one or more storage devices 834, such as but not limited to a hard-drive, CD-ROM, or other computer readable media, for storing data and computer-readable instructions and/or software that perform operations disclosed herein. Exemplary storage device 834 can also store one or more databases for storing any suitable information required to implement exemplary embodiments. The databases can be updated manually or automatically at any suitable time to add, delete, and/or update one or more items in the databases.

The computing device 810 can include a network interface 822 configured to interface via one or more network devices 832 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 822 can include a built-in network adapter, network interface card, PCMCIA network card, card bus network adapter, wireless network adapter, USB network adapter, modem or any other device suitable for interfacing the computing device 810 to any type of network capable of communication and performing the operations described herein. Moreover, the computing device 810 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 810 can run any operating system 826, such as any of the versions of the Microsoft® Windows® operating systems (Microsoft, Redmond, Wash.), the different releases of the Unix and Linux operating systems, any version of the MAC OS® (Apple, Inc., Cupertino, Calif.) operating system for Macintosh computers, any embedded operating system, any real-time operating system, any open source operating system, any proprietary operating system, or any other operating system capable of running on the computing device and performing the operations described herein. In exemplary embodiments, the operating system 826 can be run in native mode or emulated mode. In an exemplary embodiment, the operating system 826 can be run on one or more cloud machine instances.

Figure 14:
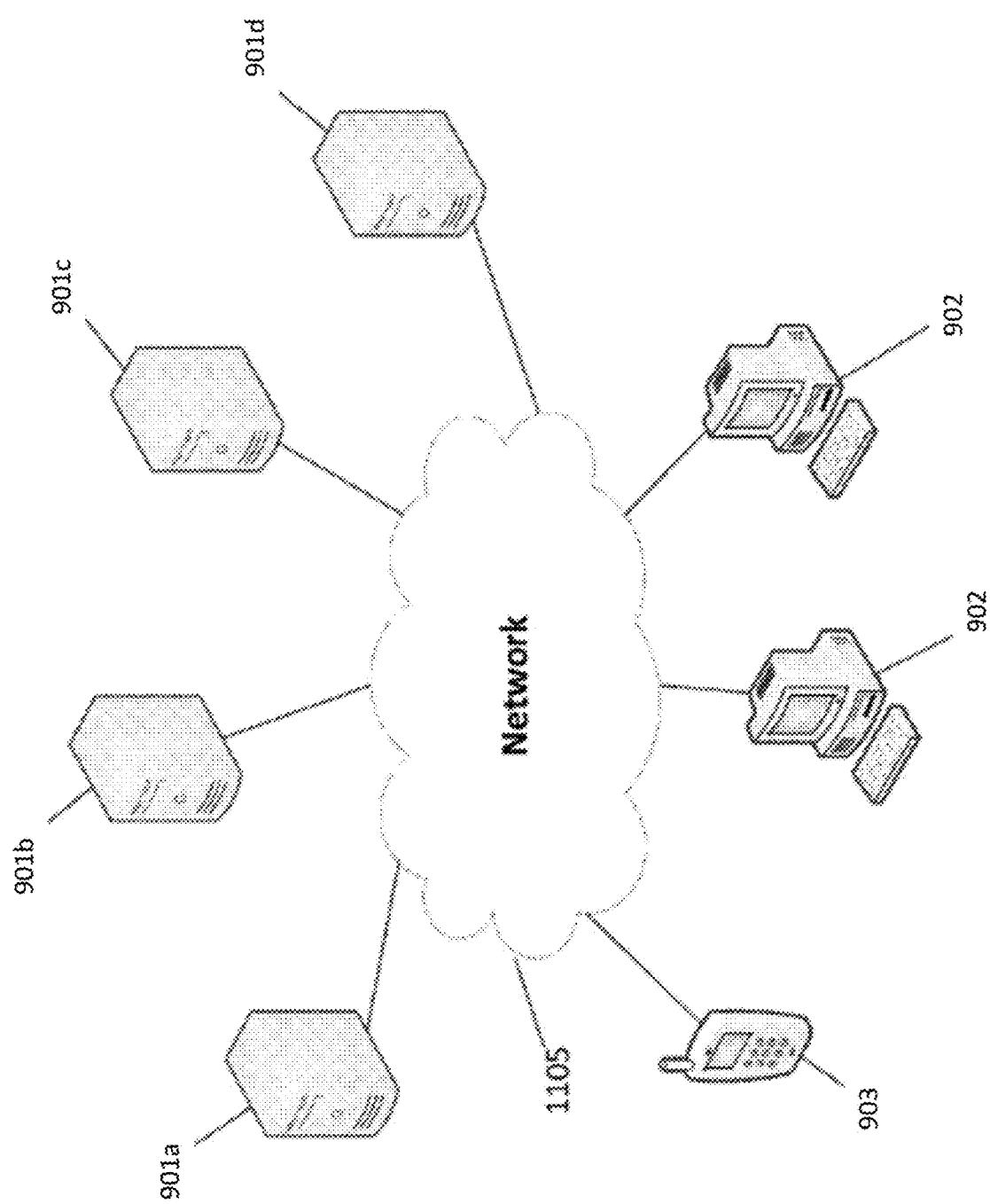
FIG. 14 is a network diagram of an exemplary distributed network which may be utilized in a retail operation described herein.

FIG. 14 is an example computational device block diagram of certain distributed embodiments. Although FIGS. 1-12, and portions of the exemplary discussion above, make reference to a retail management system 15 and an order-server 14 each operating on an individual or common computing device, one will recognize that any one of the retail management system 15, the order-server 14, and/or the zone server may instead be distributed across a network 905 in separate server systems 901*a-d* and possibly in user systems, such as kiosk, desktop computer device 902, or mobile computer device 903. For example, the order-server 14 and/or the zone server may be distributed amongst the tablets 48 of the robots 18. In some distributed systems, modules of any one or more of the retail environment management system software, the order-server software, and the zone engine can be separately located on server systems 901*a-d* and can be in communication with one another across the network 905.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

What is claimed is:
1. A method for customer assisted robot picking in a retail space having items for purchase, comprising:
receiving an order of a first customer, the order comprising one or more items;
navigating a robot to a pose location within the retail space in proximity to an item to be picked for the order of the first customer;
the robot identifying, by a sensor in communication with the robot, a second customer located within a zone proximate the robot at the pose location;

communicating to the second customer information identifying the item to be picked for the order of the first customer;

detecting presentation of the item by the second customer for identification; and updating performance data for the second customer stored in a customer account to include data corresponding to picking of the item by the second customer.

2. The method of claim 1, further comprising:

accessing, via the robot in response to the identification of the second customer, the second customer account.

3. The method of claim 1, further comprising:

receiving, from the second customer account the updated customer performance data; and rendering, on an interactive display device of the robot, in response to the second customer performance data, at least one graphic representation of customer assistance achievement.

4. The method of claim 3, wherein the step of rendering further comprises: displaying at least one customer reward for the second customer on the interactive display device.

5. The method of claim 4, wherein the at least one customer reward is rendered in response to a milestone achieved by the second customer.

6. The method of claim 4, wherein the at least one customer reward includes one or more of an earned discount, a free promotional item, a store credit, a cash back incentive, redeemable loyalty points, or combinations thereof.

7. The method of claim 5, wherein the milestone includes at least one of a predefined number of units picked by the second customer, a predefined pick rate of the second customer, or a predefined number of units picked by the second customer without scanning an erroneous unit.

8. The method of claim 1, wherein the step of identifying further comprises: reading, by the sensor, an ID tag of the second customer.

9. The method of claim 8, wherein the ID tag is at least one of a passive RFID tag, an active RFID tag, a Bluetooth transceiver, or a near field communications (NFC) beacon.

10. The method of claim 8, wherein the sensor is at least one of an RFID reader, a Bluetooth transceiver, or a NFC transceiver.

11. The method of claim 1, wherein the step of identifying further comprises:

capturing, by the sensor, a facial image of the second customer; and comparing the captured facial image to an image recognition database.

12. The method of claim 11, wherein the sensor is at least one of a digital camera, a digital video camera, an image sensor, a charge coupled device (CCD), or a CMOS sensor.

13. The method of claim 1, wherein the step of identifying further comprises:

capturing, by the sensor, at least one of a voiceprint of the second customer, a retinal pattern of the second customer, or a fingerprint pattern of the second customer; and comparing the captured at least one of a voiceprint of the second customer, a retinal pattern of the second customer, or a fingerprint pattern of the second customer to a corresponding customer account database.

14. The method of claim 1, wherein the sensor is at least one of an imaging device, a camera, a video camera, an audio sensor, a retinal scanner, a fingerprint scanner, an infrared scanner, a barcode scanner, or a RFID reader.

15. The method of claim 1, wherein the performance data for the second customer includes data corresponding to picking of items by the second customer from orders of customers other than the first customer.

16. A system for customer assisted robot picking in a retail space having items for purchase, comprising:

a robot operating within the retail space; and a sensor in electronic communication with the robot, wherein the robot includes:

a processor; and a memory storing instructions that, when executed by the processor, cause the robot to:

receive an order of a first customer, the order comprising one or more items;

navigate the robot to a pose location within the retail space in proximity to an item to be picked for the order of the first customer;

identify, by the sensor, a second customer located within a zone proximate the robot at the pose location;

communicate to the second customer information identifying the item to be picked for the order of the first customer;

detect presentation of the item by the second customer for identification; and update customer performance data for the second customer stored in a customer account to include data corresponding to picking of the item by the second customer.

17. The system of claim 16, wherein the memory storing instructions that, when executed by the processor, further cause the robot to: access, via the robot in response to the identification of the second customer, the second customer account.

18. The system of claim 16, wherein the memory storing instructions that, when executed by the processor, further cause the robot to: receive, from the second customer account the updated customer performance data; and render, on an interactive display device of the robot, in response to the second customer performance data, at least one graphic representation of customer assistance achievement.

19. The system of claim 18, wherein the memory storing instructions that, when executed by the processor, further cause the robot to: display at least one customer reward for the second customer on the interactive display device.

20. The system of claim 16, wherein the sensor is at least one of an imaging device, a camera, a video camera, an audio sensor, a retinal scanner, a fingerprint scanner, an infrared scanner, a barcode scanner, or a RFID reader.

21. The system of claim 20, wherein the at least one customer reward includes one or more of an earned discount, a free promotional item, a store credit, a cash back incentive, redeemable loyalty points, or combinations thereof.

22. The system of claim 19, wherein the milestone includes at least one of a predefined number of units picked by the second customer, a predefined pick rate of the second customer, or a predefined number of units picked by the second customer without scanning an erroneous unit.

23. The system of claim 16, wherein the memory storing instructions that, when executed by the processor, further cause the robot to: read, by the sensor, an ID tag of the second customer.

24. The system of claim 23, wherein the ID tag is at least one of a passive RFID tag, an active RFID tag, a Bluetooth transceiver, or a near field communications (NFC) beacon.

25. The system of claim 23, wherein the sensor is at least one of an RFID reader, a Bluetooth transceiver, or a NFC transceiver.

26. The system of claim 16, wherein the memory storing instructions that, when executed by the processor, further cause the robot to: capture by the sensor, a facial image of the second customer; and compare the captured facial image to an image recognition database.

27. The system of claim 25, wherein the sensor is at least one of a digital camera, a digital video camera, an image sensor, a charge coupled device (CCD), or a CMOS sensor.

28. The system of claim 16, wherein the memory storing instructions that, when executed by the processor, further cause the robot to: capture, by the sensor, at least one of a voiceprint of the second customer, a retinal pattern of the second customer, or a fingerprint pattern of the second customer; and compare the captured at least one of a voiceprint of the second customer, a retinal pattern of the second customer, or a fingerprint pattern of the second customer to a corresponding customer account database.

29. The system of claim 20, wherein the at least one customer reward is rendered in response to a milestone achieved by the second customer.

30. The system of claim 16, wherein the performance data for the second customer includes data corresponding to picking of items by the second customer from orders of customers other than the first customer.

* * * * *